Figure 1:
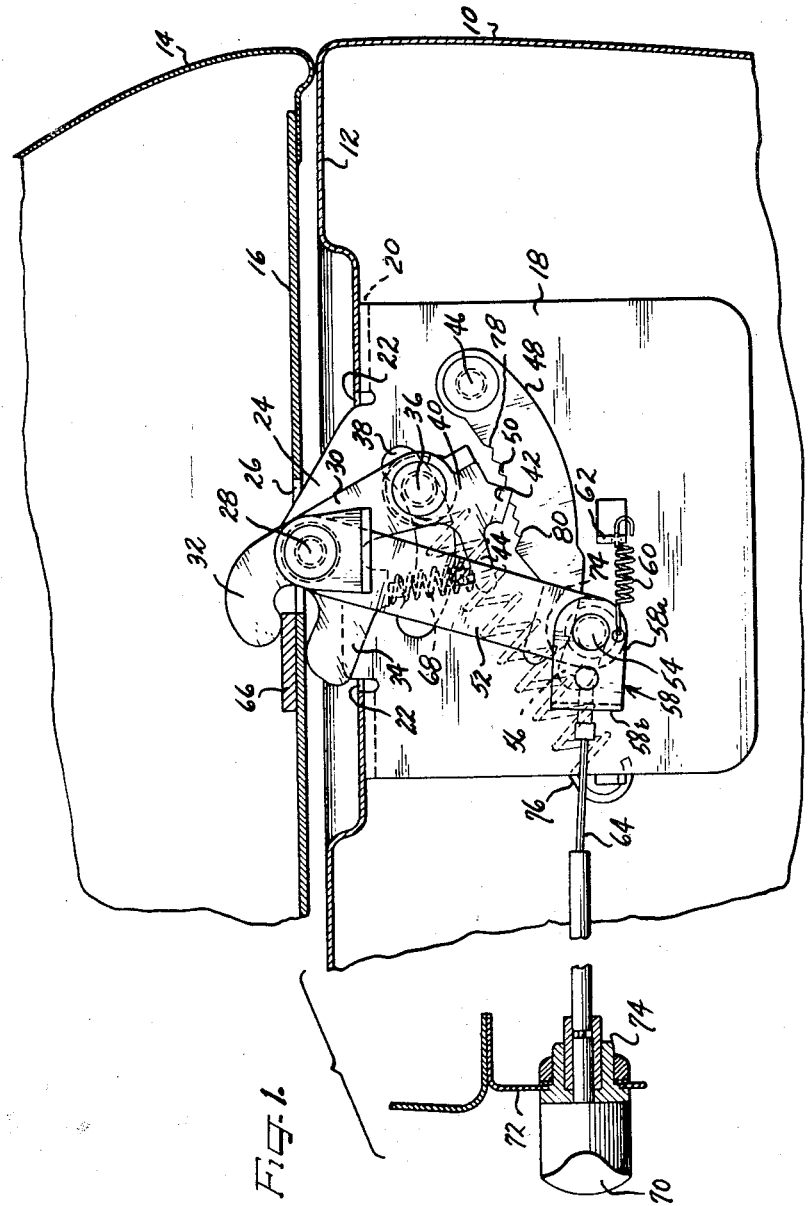

May 9, 1950  E. D. DALL  2,507,196
HOOD LATCH

Filed April 25, 1947  2 Sheets-Sheet 1

Inventor
EDWARD D. DALL
by
Attys.

May 9, 1950

E. D. DALL 2,507,196

HOOD LATCH

Filed April 25, 1947

2 Sheets-Sheet 2

Inventor
EDWARD D. DALL
by The Firm of Charles Thrills
Attys.

Patented May 9, 1950

2,507,196

UNITED STATES PATENT OFFICE 2,507,196

HOOD LATCH

Edward D. Dall, Detroit, Mich., assignor to Houdaille-Hershey Corporation, Detroit, Mich., a corporation of Michigan Application April 25, 1947, Serial No. 743,841

12 Claims. (Cl. 292—99)

This invention relates to a latching mechanism adapted particularly for latching automobile hood covers of the "alligator" type, which are hinged at their rear end along a hinge line extending transversely of the vehicle. Hoods of this type usually are latched in their closed position by a latching mechanism controllable from inside of the vehicle for effecting unlatching of the cover and a partial raising thereof.

The latching mechanisms heretofore known in the art, which are controllable from inside the vehicle for unlatching the cover, have been subject to the disadvantage that the manual force required to effect the unlatching of any particular latch installation is largely unpredictable. The required force substantially varies in a direct relation with the degree of tightness of closure of the cover in the closed position. The cover, when forced tightly closed, produces a reaction force on the cooperating members of the latch mechanism which requires considerable additional effort to effect their initial unlatching movements. A similar condition may result due to accumulation of manufacturing tolerances of the hood, cover and the latch parts. In other installations where the cover is loosely latched due to manufacturing variables or the closing operation, only a slight force may be required to effect the unlatching operation of the latch mechanism. Where such is the case there is the danger of inadvertent unlatching produced by vibration of the vehicle.

In accordance with this invention, a latching mechanism is provided wherein the force required for the unlatching operation may be predetermined and is substantially independent of variances in dimensions of parts allowed by manufacturing tolerances and for variances produced in the fit of the cover due to the force with which it is c'osed.

A latching mechanism constructed in accordance with this invention employs a main latching member pivotally mounted to the fixed portion of the hood for cooperation with a keeper on the movable cover. The main latching member has a locking pawl fixed thereto which of course moves with the main latch. A pivotally mounted rack member having a plurality of spaced teeth or detents is employed for cooperation with the locking pawl. Movement of the rack member into a position proximate to the path of the pawl for cooperation with the pawl may be effected by a shiftable wedge which holds the rack member in engagement with the pawl. The position of the wedge is in turn controlled by a cable which may be manually operated from inside the vehicle. When the hood cover is closed the main latching member is automatically shifted to latched position and retained therein by one of the detents on the rack member receiving the pawl and preventing reverse movement of the pawl. The displacement of the pawl along the rack detents varies with the closure of the cover. When tightly closed, the pawl is positioned closer to the pivotal axis of the rack than when the cover is loosely closed. When the pawl is positioned near the pivotal axis of the rack the effective lever arm of the reaction force between pawl and rack is less than when the pawl is positioned more remotely from the pivotal axis as results from a looser closing of the cover. Hence the pawl and rack are so disposed so as to require no exceptional initial force on the cable and wedge mechanism to effect the disengagement of the pawl from the rack.

Accordingly an object of this invention is to provide an improved latching mechanism, particularly adaptable for automobile hood applications.

Another object of this invention is to provide a latch mechanism for vehicle hoods or the like operable from inside the vehicle, which will unlatch by application of substantially the same force in any vehicle in which installed, irrespective of variances produced by manufacturing tolerances.

A further object of this invention is to provide a latching control mechanism requiring sufficient force to operate under all conditions so as to make unlatching due to vibration of the vehicle impossible.

The specific nature of the invention as well as other objects and advantages will become apparent to those skilled in the art from the following detailed description of the annexed sheets of drawings which, by way of preferred example only, illustrate one specific embodiment of the invention.

Figure 2:
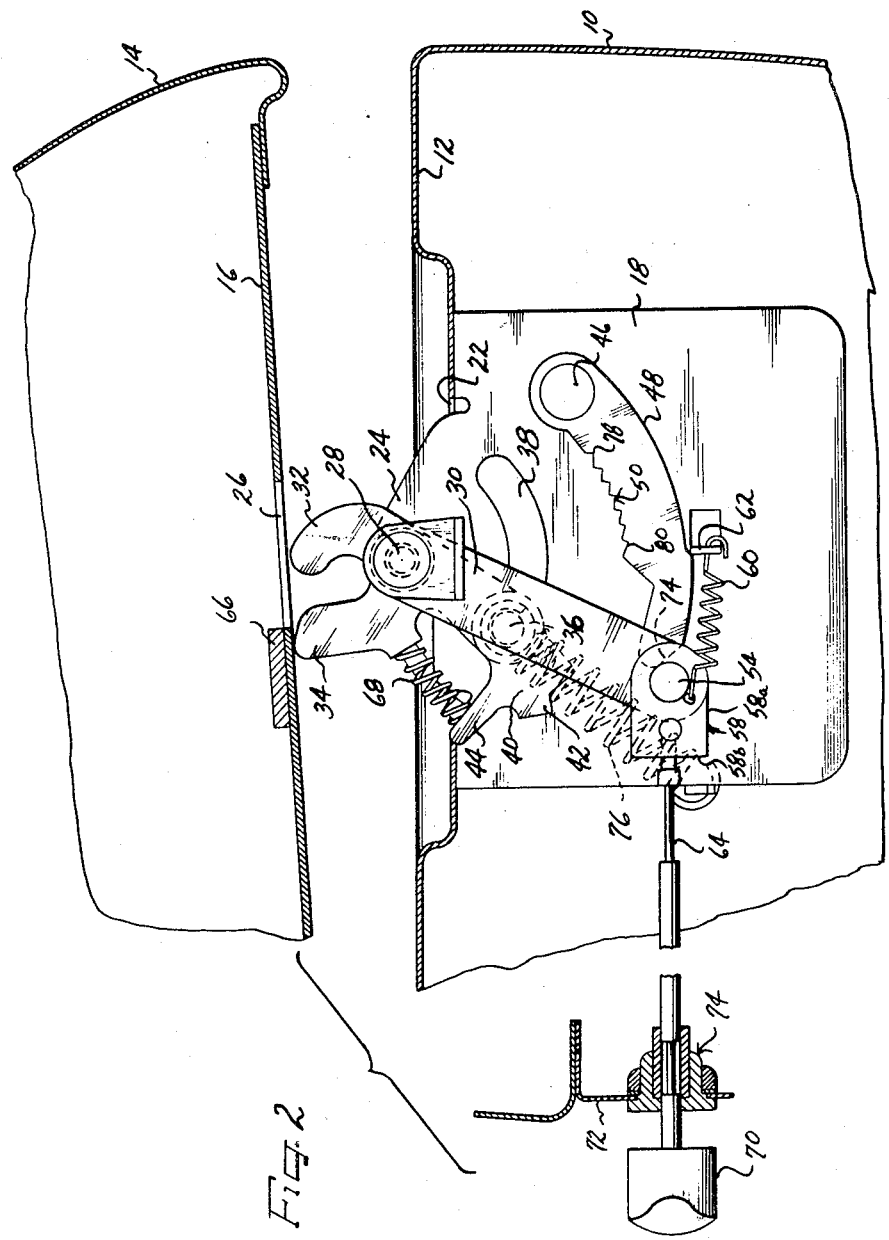

On the drawings:

Figure 1 is a side elevation of the latching assembly in its latching position, a part of the vehicle hood and cover being shown in longitudinal section; and Figure 2 is a view similar to Figure 1, but showing the position of the elements in the unlatched condition.

As shown on the drawings:

An open top hood body 10 of the type generally utilized in modern automotive vehicles is provided with a horizontal ledge or shelf 12 near the front end thereof. A hood cover 14 is utilized to close the open top of hood body 10 and such cover is provided with a transversely extending ledge or plate 16, which in the closed position of the cover (Figure 1) overlies the ledge 12.

The latch mechanism and its controlling elements are mounted on a vertical supporting plate 18 located substantially midway between the sides of the hood body and having horizontally deflected ears 20 secured against the underside of the shelf 12 for supporting the plate in depending relation thereto. The plate 18 is positioned so that its upper edge is adjacent to an aperture 22 in shelf 12, and plate 18 has an integral upward extension 24 which projects through the aperture 22. A latch receiving aperture 26 is provided in the cover ledge 16, overlying aperture 22, and through which the extreme top portion of extension 24 of plate 18 extends when the cover is in closed position.

Secured to the extension 24 of supporting plate 18 is a horizontal latch pivot stud 28. A primary latch member 30 is medially pivoted to stud 28 and has a bifurcated upper end forming jaws 32 and 34. The lower end of latch 30 carries a horizontally disposed stud 36 which extends through an arcuate slot 38 in the plate 18. The slot 38 is below the stud 28 and is struck on a radius having its center in the axis of stud 28. A pawl 40 is pivoted to horizontal stud 36 on the same side of plate 18 as the latch member 30. Pawl 40 has a tooth 42 depending from its lower end and also has a lateral projection or tongue 44. A spring 68 is disposed between the lower jaw 34 and the lateral projection 44 of pawl 40, thus urging the pawl counterclockwise with the pawl tooth 42 extending downward.

Below slot 38 is an arcuately shaped rack member which is shiftably mounted with respect to the plate 18 as by being pivoted at one end on a horizontal pin 46. The upper or concave edge of the rack member is provided with a plurality of spaced detents such as the teeth 50. Each of such detents is suitably shaped so as to snugly receive the pawl tooth 42.

A link 52 is pivoted at its upper end to the stud 28 and disposed parallel and adjacent to the latch member 30 and rack 48. Link 52 carries at its lower end a roller 54 which engages the convex edge of the rack 48 at a region remote from the stud 46. The plate 18 has a second slot 56 through which one end of the hub of the roller 54 projects.

An angle plate 58 has one leg 58a parallel to plate 18 and has a suitable hole providing a bearing for the other end of the hub of roller 54. Also affixed to leg 58a of the angle plate 58 is one end of a tension spring 60. The other end of spring 60 is attached to an outwardly deflected ear 62 formed on plate 18. The other leg 58b of angle plate 58 has connected to it one end of a pull rod or control cable 64. The tension spring 60 urges the roller 54 to the right hand end of the slot 56. When the roller 54 is in this position it raises the rack 48 to its extreme clockwise position by action on the convex edge of the rack 48, thereby functioning as a camming wedge with respect to the rack. When the rack is thus raised, the teeth 50 of the rack will be engaged by the downwardly extending pawl tooth 42.

When the hood cover 14 is closed as shown in Figure 1 of the drawings, the jaw 32 extends through the latch receiving aperture 26 and rests atop a keeper abutment plate 66 with the lower jaw 34 adjacent and below the abutment plate 66, thus maintaining the cover 14 in the closed position. The jaws 32 and 34 on the latch member 30 are held in this closed position by the engagement of pawl 40 with rack 48, such engagement constituting the teeth 50 of rack 48 receiving pawl tooth 42 and resisting reverse movement of the pawl. A tension spring 76 on the opposite side of plate 18 is fastened at its lower end to the plate 18 and its upper end to stud 36 and biases latch 30 and pawl 40 to their cover unlatching position.

To effect the unlatching operation and partially raise the cover 14, as shown in Figure 2, an operator inside the vehicle pulls a handle or button 70 provided adjacent the instrument panel 72 of the vehicle. The button 70 is connected to the cable 64 which runs through a fitting 74 attached to the panel 72.

The cable 64, in being pulled to the left, carries the attached angle plate 58 and hence shifts the roller 54 in a like direction. The roller 54 in moving to the left follows a path determined by the slot 56. This movement to the left is opposed by the tension spring 60 attached to angle plate 58. When the roller 54 approaches the left end of slot 56, the rack 48 is thereby permitted to shift counterclockwise to the position shown in Figure 2 by the reaction force exerted by pawl 40. This lowering occurs more rapidly when the roller 54 engages the cam surface 74 of rack 48. When the operator releases the button 70 and the resulting force on cable 64, the tension spring 60 acts to return the roller 54 to the right end of slot 56 and the rack is returned to its clockwise position.

When the rack 48 has thus been lowered, the pawl tooth 42 and rack teeth 50 become disengaged. When this occurs, the spring 76 urges the stud 36 to the left end of arcuate slot 38. Hence the latch member 30 likewise is moved, causing a clockwise movement of the jaws 32 and 34 about the stud 28. The removal of downward pressure on abutment plate 66 by jaw 32 and the accompanying upward pressure of jaw 34 on ledge 16 puts the cover 14 in an unlatched and partially raised position as shown in Figure 2.

Any forceful closing of cover 14 exerts a downward pressure on jaw 34 which causes a counterclockwise movement of latch member 30 and a like movement of stud 36 in slot 38 against the tension of spring 76. Hence the attached pawl 40 and tooth 42 may again engage rack 48 at the teeth 50, the rack having been returned to its pawl locking position by operation of tension spring 60 on the roller 54 as before explained.

The displacement of pawl tooth 42 along the rack teeth 50 depends upon the fit of the cover 14 with respect to the hood body 10 and the force of closure of the cover. If the cover 14 fits tightly or is forcibly closed, the pawl tooth 42 will engage the rack teeth 50 relatively close to the pivotal axis of rack 48 as indicated at 78, thereby shortening the effective lever arm of the reaction force of pawl 40 in engagement with the rack.

If the cover for any reason fits loosely, the pawl tooth 42 will engage substantially as indicated at 80, lengthening the effective lever arm of the reaction force of pawl 40 in engagement.

Thus it can be seen that the force for operating the cable to release the rack from the pawl to effect unlatching of the hood cover remains substantially constant for all installations of the latching mechanism in all vehicles and for each closure of the covers in such vehicles without regard to the force by which such closure is effected.

One embodiment of an arcuate rack has been shown in which triangularly cut teeth or detents are employed. To those skilled in the art, it is obvious that many other modifications employing various forms of teeth or abutments successively more remotely spaced from the pivotal axis of the rack or similar member may be equally successfully employed. It will, of course, be understood that various details of construction may be modified through a wide range without departing from the principles of this invention, and it is, therefore, not the purpose to limit the patent granted hereon otherwise than necessitated by the scope of the appended claims.

I claim as my invention:

1. In a latch mechanism for association with a closure member and a cooperating member, a latching assembly for mounting on one of the members comprising a pivoted latch reversibly movable between a locking and an unlocking position, said latch being retractable by the other member during relative movement of said members one toward the other and being lockingly engageable with a keeper carried by said other member, a pawl secured to said latch, a rack member pivotally mounted adjacent the path of movement of said pawl and movable into and out of engagement with said pawl, said rack member having a plurality of abutments spaced successively more remote from the pivotal axis of said rack member, said pawl being constructed and arranged to engage said abutments in positions successively less remote from said pivotal axis as said latch moves in its locking direction, whereby the effective lever arm of the reaction force exerted by said pawl on said rack is progressively lessened as said latch moves in its locking direction and manually operable means controllable from a remote position for controlling the pivotal position of said rack with respect to said pawl.

2. In a latch mechanism for association with a closure member and a cooperating member, a latching assembly for mounting on one of the members comprising a shiftable latch, reversibly movable between a locking and an unlocking position, said latch being retractable by the other member during relative movement of said members one toward the other and being lockingly engageable with a keeper carried by said other member, a pawl secured to said latch, a rack shiftably mounted adjacent the path of movement of said pawl and movable into and out of engagement with said pawl, a shiftable positioning member engaging said rack in supporting relation and normally positioning said rack in its pawl engaging position, and manually operable means controllable from a remote position for shifting said positioning member to permit said rack to move out of engagement with said pawl.

3. In a latch mechanism for association with a closure member and a cooperating member, a latching assembly for mounting on one of the members comprising a pivoted latch reversibly movable between a locking and an unlocking position, said latch being retractable by the other member during relative movement of said members one toward the other and being lockingly engageable with a keeper carried by said other member, a pawl secured to said latch, a rack member pivotally mounted adjacent the path of movement of said pawl and movable into and out of engagement with said pawl, said rack member having a plurality of abutments spaced successively more remote from the pivotal axis of said rack member, said pawl being constructed and arranged to engage said abutments in positions successively less remote from said pivotal axis as said latch moves in its locking direction, whereby the effective lever arm of the reaction force exerted by said pawl on said rack is progressively lessened as said latch moves in its locking direction, a shiftable positioning member engaging said rack in camming relation and normally positioning said rack in its pawl engaging position, and manually operable means controllable from a remote position for shifting said positioning member to permit said rack to move out of engagement with said pawl.

4. A latching assembly comprising a pivoted latch reversibly movable between a locking and an unlocking position, a pawl secured to said latch, an arcuate rack member having one end pivotally mounted adjacent the path of movement of said pawl and movable into and out of engagement with said pawl, said rack member having a plurality of spaced abutments along the concave edge thereof, said abutments being spaced successively more remote from the pivotal axis of said rack member, said pawl being constructed and arranged to engage said abutments in positions successively less remote from said pivotal axis as said latch moves in its locking direction, whereby the effective lever arm of the reaction force exerted by said pawl on said rack is progressively lessened as said latch moves in its locking direction, a shiftable positioning member engaging the convex edge of said rack adjacent the end of said rack remote from said pivotal axis, said positioning member engaging said rack in camming relation and normally positioning said rack in its pawl engaging position, and manually operable means controllable from a remote position for shifting said positioning member to permit said rack to move out of engagement with said pawl.

5. A hood latching assembly comprising a pivoted latch reversibly movable between a locking and an unlocking position, a spring secured to said latch and urging said latch toward its unlocked position, a pawl secured to said latch, a rack member pivotally mounted adjacent the path of movement of said pawl and movable into and out of engagement with said pawl, said rack member having a plurality of abutments spaced successively more remote from the pivotal axis of said rack member, said pawl being constructed and arranged to engage said abutments in positions successively less remote from said pivotal axis as said latch moves in its locking direction, whereby the effective lever arm of the reaction force exerted by said pawl on said rack is progressively lessened as said latch moves in its locking direction, and means for controlling the pivotal position of said rack with respect to said pawl, including a manually shiftable cable operable remotely from the hood.

6. In combination, a shiftable latch, reversibly movable between a locking and an unlocking position, a pawl secured to said latch, a rack shiftably mounted adjacent the path of movement of said pawl and movable into and out of engagement with said pawl, a roller engaging said rack, a shiftable bearing for said roller having a normal position wherein said roller holds said rack in pawl engaging position, and a manually operable control cable connected to said shiftable bearing for shifting said roller to permit said rack to move out of engagement with said pawl.

7. A latching assembly comprising a pivoted latch reversibly movable between a locking and an unlocking position, a pawl secured to said latch, an arcuate rack member having one end pivotally mounted adjacent the path of movement of said pawl and movable into and out of engagement with said pawl, said rack member having a plurality of spaced abutments along the concave edge thereof, said abutments being spaced successively more remote from the pivotal axis of said rack member, said pawl being constructed and arranged to engage said abutments in positions successively less remote from said pivotal axis as said latch moves in its locking direction, whereby the effective lever arm of the reaction force exerted by said pawl on said rack is progressively lessened as said latch moves in its locking direction, a roller engaging the convex edge of said rack adjacent the end of said rack remote from said pivotal axis, said roller engaging said rack in camming relation and normally positioning said rack in pawl engaging position, a shiftable bearing for said roller, and a manually operable control cable connected to said shiftable bearing for shifting said roller to permit said rack to move out of engagement with said pawl.

8. In a latch mechanism for association with a closure member and a cooperating member, a latching assembly for mounting on one of the members comprising a mounting plate, a latch pivotally mounted to said plate, said latch being reversibly movable between a locking and an unlocking position, said latch being retractable by the other member during relative movement of said members one toward the other and being lockingly engageable with a keeper carried by said other member, a pawl secured to said latch, a rack pivotally mounted on said plate adjacent the path of movement of said pawl and movable into and out of engagement with said pawl, said rack member having a plurality of abutments spaced successively more remote from the pivotal axis of said rack, said pawl being constructed and arranged to engage said abutments in positions successively less remote from said pivotal axis as said latch moves in its locking direction, whereby the effective lever arm of the reaction force exerted by said pawl on said rack is progressively lessened as said latch moves in its locking direction, and manually operable means for controlling the pivotal position of said rack with respect to said pawl.

9. A latching assembly for automobile hoods comprising a vertically mounted plate, a latch pivotally mounted to said plate, said latch being reversibly movable between a locking and an unlocking position, a pawl secured to said latch, a rack pivotally mounted on said plate adjacent the path of movement of said pawl and movable into and out of engagement with said pawl, a roller engaging said rack, a shiftable bearing for said roller having a normal position wherein said roller holds said rack in pawl engaging position, said vertically mounted plate having a bearing slot therein guiding the movement of said roller, and a manually operable control cable connected to said shiftable bearing for shifting said roller in said bearing slot to permit said rack to move out of engagement with said pawl.

10. A latching assembly for automotive hoods wherein a hinged cover is employed to close an open-top hood, a vertical plate mounted centrally in said hood, a ledge on said cover having a slot therein, a latch pivotally mounted to said plate, said latch being reversibly movable between a locked and an unlocked position, said latch being constructed and arranged to protrude through said slot in said ledge and engage said ledge in said locked position and to release said ledge and said cover when said latch is moved to said unlocked position, said plate having an arcuate slot therein, means on said latch cooperating with said slot for guiding the movement of said latch, a spring attached between said plate and said latch to urge said latch toward said unlocked position, a pawl pivotally secured to said latch, a rack pivotally mounted to said plate adjacent the path of movement of said pawl and movable into and out of engagement with said pawl, said rack having a plurality of abutments spaced successively more remote from the pivotal axis of said rack, said pawl being constructed and arranged to engage said abutments in positions successively less remote from said pivotal axis as said latch moves in its locking direction, whereby the effective lever arm of the reaction force exerted by said pawl on said rack is progressively lessened as said latch moves in said locking direction, a roller engaging said rack, a shiftable bearing for said roller having a normal position wherein said roller holds said rack in pawl engaging position, said plate having a bearing slot therein for guiding the movement of said roller, and a manually operable control cable connected to said shiftable bearing for shifting said roller in said bearing slot to permit said rack to move out of engagement with said pawl.

11. In a hood latch for association with a closure member and a cooperating member, a latch assembly for mounting on one of the members comprising a pivoted latch movable by the other member during relative movement of said members one toward the other into latching engagement with a keeper carried by said other member, a pawl connected with said latch, a multiple-toothed rack pivoted at one end thereof, shiftable means in one position supporting the unpivoted end of said rack to position the teeth of the rack for engagement with the pawl during rotation of the latch in a latching direction, and means for shifting said supporting means thereby freeing the unpivoted end of the rack for movement away from said pawl.

12. In a hood latch for association with a closure member and a cooperating member, a latch assembly for mounting on one of the members comprising a pivoted latch movable by the other member during relative movement of said members one toward the other into latching engagement with a keeper carried by said other member, a pawl connected with said latch, a multiple-toothed rack pivoted at one end thereof, shiftable means in one position supporting the unpivoted end of said rack to position the teeth of the rack for engagement with the pawl during rotation of the latch in a latching direction, and means for shifting said supporting means thereby freeing the unpivoted end of the rack for movement away from said pawl, said rack being so pivotally mounted relatively to the latch that during latching rotation of the latch the pawl carried thereby moves toward the pivoted end of the rack.

EDWARD D. DALL.

REFERENCES CITED

The following references are of record in the file of this patent:

UNITED STATES PATENTS

| Number | Name | Date |
|---|---|---|
| 738,100 | Cuntz | Sept. 1, 1903 |
| 2,246,787 | Dall | June 24, 1941 |
| 2,274,711 | Krause | Mar. 3, 1942 |

FOREIGN PATENTS

| Number | Country | Date |
|---|---|---|
| 25,596 | Great Britain | Nov. 13, 1906 |